United States Patent
Brown et al.

[11] Patent Number: 6,039,226
[45] Date of Patent: Mar. 21, 2000

[54] PICKUP TRUCK SPARE TIRE MOUNT

[76] Inventors: Milton D. Brown; Barbara A. Brown, both of 500 Fourth St. Box 192, Elliot, Iowa 51532

[21] Appl. No.: 09/256,825

[22] Filed: Feb. 24, 1999

[51] Int. Cl.[7] .............................. B62D 43/02; D62D 43/00
[52] U.S. Cl. ................................. 224/42.24; 224/42.12; 224/403; 224/550
[58] Field of Search ........................ 224/400, 401, 224/402, 403, 42.12, 42.13, 42.14, 42.21, 42.24, 42.25; 414/463; 296/37.2, 37.6

[56] References Cited

U.S. PATENT DOCUMENTS

| | | | |
|---|---|---|---|
| D. 308,959 | 7/1990 | Ware | D12/202 |
| D. 310,507 | 9/1990 | Ware | D12/202 |
| 2,772,826 | 12/1956 | Krengel | 224/403 X |
| 3,204,840 | 9/1965 | Bowen | 224/42.24 |
| 3,613,972 | 10/1971 | Daughhetee | 224/42.24 |
| 4,007,863 | 2/1977 | Norris | 224/403 |
| 4,089,449 | 5/1978 | Bayne et al. | 224/403 X |
| 4,162,098 | 7/1979 | Richardson, III | 224/403 X |
| 4,366,923 | 1/1983 | Koch | 224/42.24 |
| 4,387,837 | 6/1983 | Carr et al. | 224/42.21 |
| 4,416,402 | 11/1983 | Matthew | 224/42.24 |
| 4,598,848 | 7/1986 | Clark | 224/42.12 X |
| 4,932,575 | 6/1990 | Ware | 224/42.42 |
| 5,025,935 | 6/1991 | Hadachek | 224/403 X |
| 5,799,849 | 9/1998 | Beer et al. | 224/403 |

*Primary Examiner*—Gregory M. Vidovich
*Attorney, Agent, or Firm*—Zarley, McKee, Thomte Voorhees & Sease; Dennis L. Thomte

[57] ABSTRACT

The spare tire mount is adapted for use in a pickup truck including a bed having a floor with ribs and grooves running from front to back, and vertically upstanding side walls connected, at their upper edges, to inwardly extending horizontal flanges. The spare tire mount includes a lower unit having a base which rests on the floor of the pickup truck bed and which supports a post. An upper unit fits vertically adjustably over the post and has a bracket which, when the upper unit is adjusted vertically upward, pushes against the horizontal flange of the bed. Securing means are provided for maintaining the base and bracket in snug contact with the floor and horizontal flange, respectively. The upper unit supports means for securing the tire to the spare tire mount. The tire, when secured to the spare tire mount, rests on the base for additional stability.

12 Claims, 2 Drawing Sheets

PICKUP TRUCK SPARE TIRE MOUNT

TECHNICAL FIELD

The present invention relates generally to a device for mounting a spare tire within the bed of a pickup truck.

BACKGROUND OF THE INVENTION

The prior art includes a number of different devices designed to secure a spare tire within the bed of a pickup truck. A number of these devices are designed to secure the tire to the wall of the pickup truck in an upright position. The prior art devices have several shortcomings. Some spare tire mounts require drilling, welding or otherwise permanently disfiguring the pickup truck bed. Other mounts suffer from lack of stability due to poor design. Still other designs are not usable with a bed liner having a gradually curved junction between the floor of the bed liner and the wall of the bed liner as they are designed to rest in a junction between a truck bed floor and a truck bed wall that forms a right angle. Other spare tire mounts are susceptible to theft.

SUMMARY OF THE INVENTION

It is therefore a general object of the present invention to provide a spare tire mount for a pickup truck which does not require permanent alteration of the truck.

Another object of the invention is to provide a spare tire mount that is adjustable so that it may be used in a variety of trucks and with tires having different dimensions.

Another object is to provide a spare tire mount with superior stability.

Another object of the invention is to provide a spare tire mount that can be used in conjunction with a bed liner.

Yet another object of the invention is to provide a spare tire mount which, in use, is not susceptible to theft.

These and other objects will be apparent to those skilled in the art.

The present invention is adapted for use primarily in a pickup truck including a bed having a floor with ribs and grooves running from front to back, and vertically upstanding side walls connected, at their upper edges, to inwardly extending horizontal flanges. Most trucks also include a downwardly extending lip at the inner edge of the horizontal flange.

The structure of the spare tire mount includes a lower unit having a base which rests on the floor of the pickup truck bed and which supports a post. An upper unit fits vertically adjustably over the post and has a bracket which, when the upper unit is adjusted vertically upward, pushes against the horizontal flange of the bed. Securing means are provided for maintaining the base and bracket in snug contact with the floor and horizontal flange, respectively. The upper unit supports means for securing the tire to the spare tire mount. The tire, when secured to the spare tire mount, rests on the base for additional stability.

DESCRIPTION OF THE PREFERRED EMBODIMENT

Figure 1:
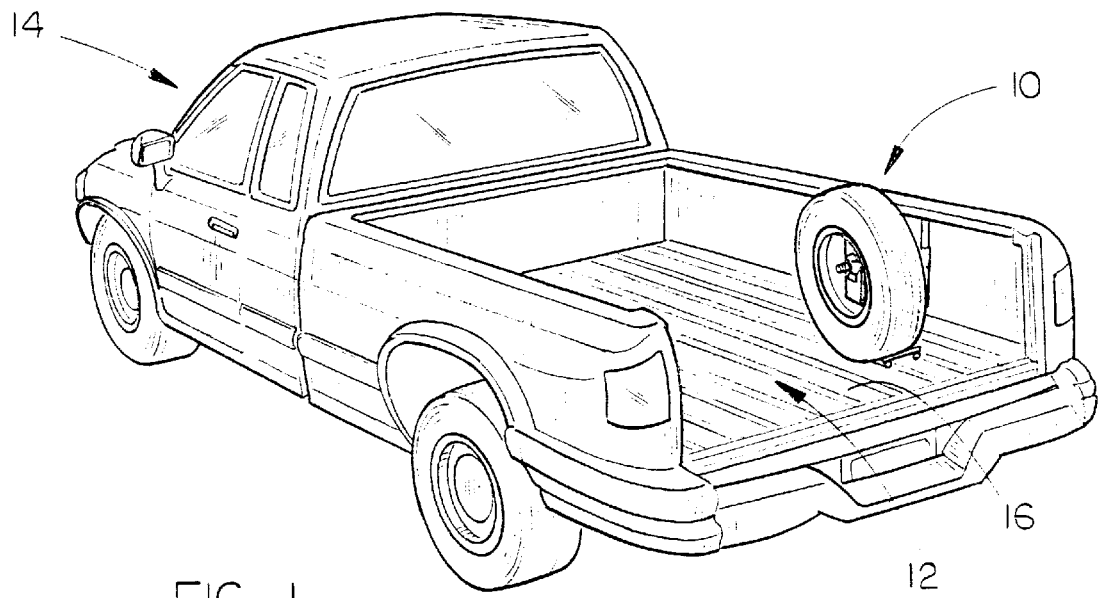
FIG. 1 is a perspective view of the pickup truck spare tire mount used in conjunction with a pickup truck.
Figure 2:
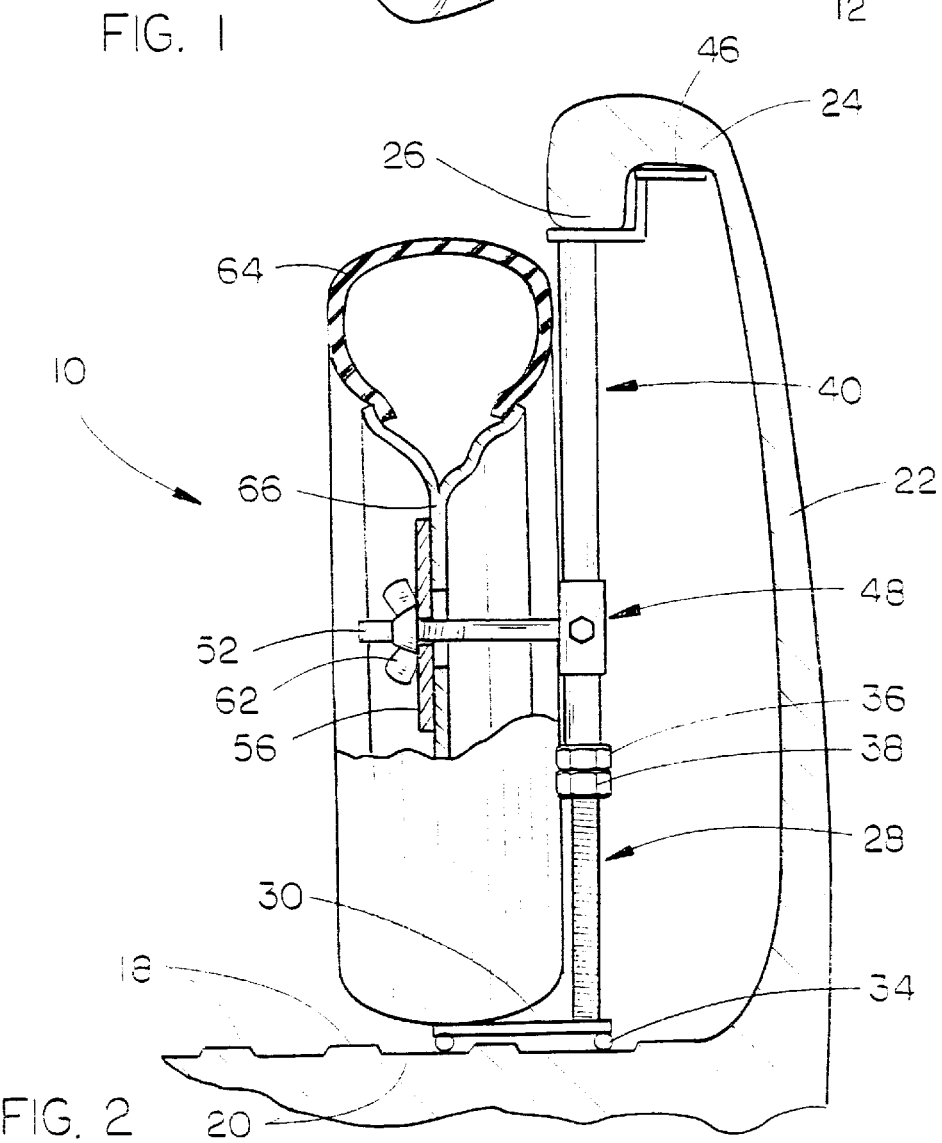
FIG. 2 is a side-sectional view of the pickup truck spare tire mount.

The pickup truck spare tire mount of the present invention is referred to generally in FIGS. 1 and 2 by the numeral 10.

As shown in FIGS. 1 and 2, the spare tire mount 10 is secured within the bed 12 of a pickup truck 14. The bed 12 of the pickup truck 14 includes a floor 16 having a series of parallel lengthwise ribs 18 and grooves 20. The bed 12 also has an upstanding side wall 22 with an upper edge. The upper edge of side wall 22 supports an inwardly extending horizontal flange 24 having a downwardly extending lip 26 at the inner end thereof.

The spare tire mount 10 generally includes lower unit 28 and upper unit 40. The lower unit 28 includes a horizontal base 30 having a vertical post 32 secured thereto which extends upwardly therefrom. Horizontal base 30 is provided with feet 34 which are adapted to rest in the grooves 20 of the bed 12. As an alternative to feet 34, horizontal base 30 may be provided with deformable padding on its underside. As an alternative to resting in the bed 12, because horizontal base 30 is not required to engage the side wall 22, horizontal base 30 may rest on a bed liner which, ordinarily, would impede access to the side wall 22. The vertical post 32 is externally threaded and adapted to threadably receive first and second nuts 36 and 38, respectively.

Upper unit 40 includes a vertically disposed sleeve 42 having an upper bracket 44 secured thereto at the upper end thereof which extends laterally therefrom. Vertically disposed sleeve 42 is adapted to slidably adjustably receive the vertical post 32. Upper bracket 44 includes an offset plate 46 adapted to engage the lower surface of the horizontal flange 24, as seen in FIG. 2.

Figure 3:
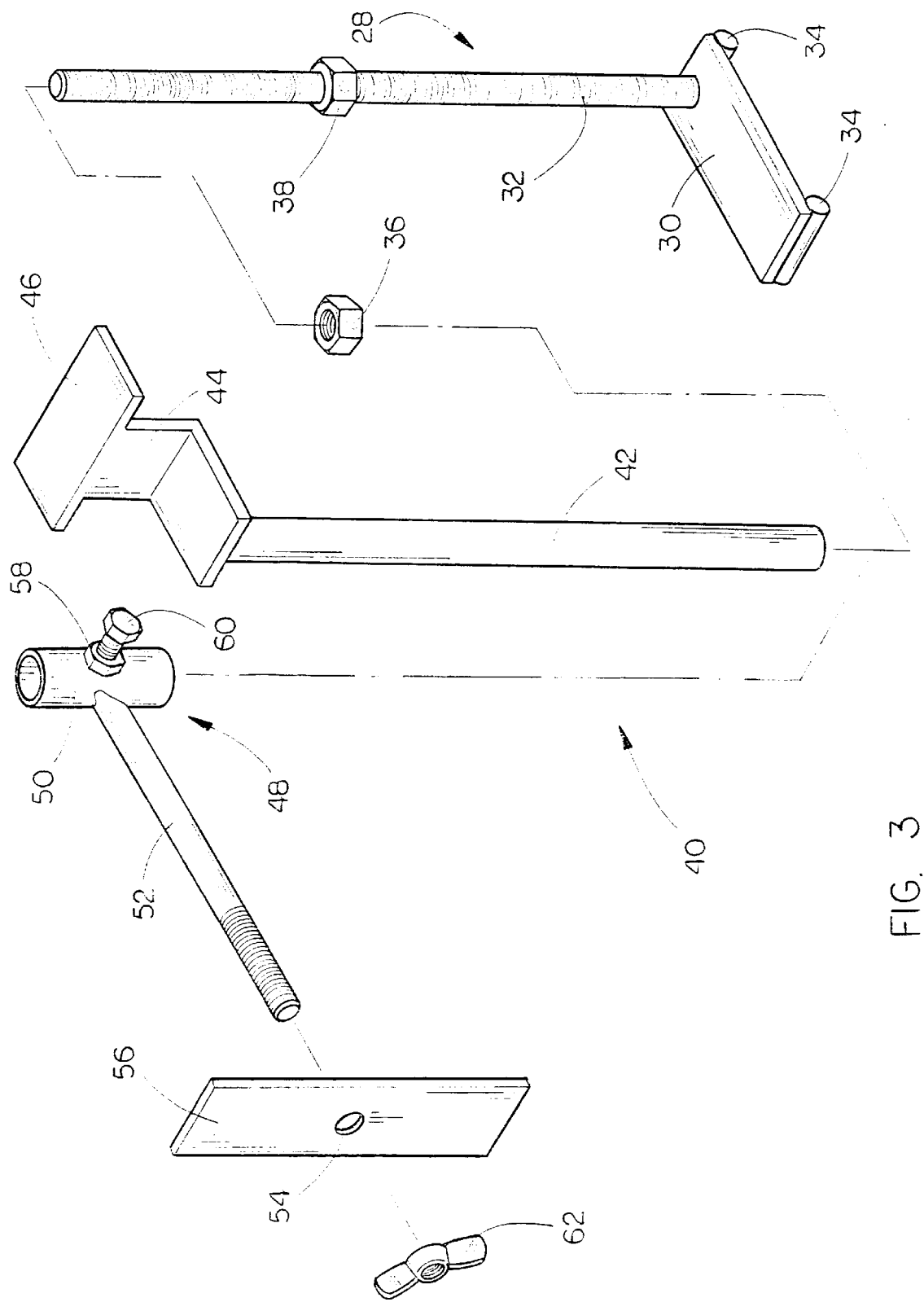
FIG. 3 is an exploded perspective view of the pickup truck spare tire mount.

The spare tire mount 10 also includes a mounting assembly 48 for securing a spare tire thereto. Mounting assembly 48 includes a collar 50 having a horizontal bolt 52 connected to and extending therefrom. Horizontal bolt 52 is adapted to extend through an opening 54 in a retaining plate 56. Collar 50 is adapted to slidably receive the vertical sleeve 42 as seen in FIG. 3. Collar 50 also includes an internally threaded opening 58 which is adapted to receive a set screw 60. Horizontal bolt 52 is externally threaded and adapted to receive a nut 62, shown as a wing nut. Preferably, the nut 62 is a locking lug nut. The nut 62 biases the retaining plate 56 in place.

In operation, the sleeve 42 is slidably extended into the collar 50 of the assembly 48. Post 32 of the lower unit 28 is then slidably inserted into the sleeve 42 of the upper unit 40. The assembled spare tire mount 10 is then positioned on the floor 16 of the bed 12 of the pickup truck 14. The feet 34 of the horizontal base 30 are positioned in the grooves 20 as seen in FIG. 2. The horizontal base 30 extends inwardly from the side wall 22 of the bed 12 with the post 32 and the sleeve 42 extending upwardly therefrom toward the lip 26. The upper unit 40 is then raised such that the upper bracket 44, and particularly offset plate 46, is in contact with the horizontal flange 24 as seen in FIG. 2. The nut 36 is then threadably moved upwardly on the post 32 to secure the upper unit 40 in position. The nut 38 is threadably moved upwardly on the post 32 to abut the first nut 36. Nuts 36 and 38 are then tightened against each other to lock first nut 36 in place.

Horizontal bolt 52 is positioned so as to extend inwardly from the sleeve 42. A spare tire 64, including a wheel 66, is positioned onto the bolt 52 so that the spare tire 64 rests on the horizontal base 30 as seen in FIG. 2. This determines the position at which the collar 50 should be secured to the sleeve 42 of the upper unit 40. Spare tire 64 is then removed to allow access to the assembly 48, and the collar 50 is secured to the sleeve 42 by the set screw 60 at that position. The spare tire 64 is once again mounted on the horizontal bolt 52 and rests on the horizontal base 30. The retaining plate 56 is placed on the horizontal bolt 52 such that it abuts the wheel 66. The nut 62 is tightened to secure the retaining plate 56 against the wheel 66 thereby securing the spare tire 64 to the spare tire mount 10 within the bed 12 of the pickup truck 14. It is important to note that when the spare tire 64 is so secured, access to the nuts 36 and 38 is effectively eliminated. If the nut 62 is a locking lug nut, the theft of the spare tire 64 and the spare tire mount 10 is deterred.

Thus it can be seen that the invention accomplishes all of its stated objectives.

We claim:

1. A spare tire mount for a pickup truck including a bed having a floor and upstanding side walls which include upper ends, the upper ends having inwardly extending flanges connected thereto, comprising:

a lower unit including a base portion having an underside configured for engagement with the floor and a substantially planar upper surface and having a rod with an upper end secured thereto which extends upwardly therefrom;

an upper unit including a substantially vertically disposed, hollow sleeve having upper and lower ends, and a bracket means secured to said sleeve at the upper end thereof, said sleeve being adjustably mounted on said upper end of said rod;

securing means adjustably mounted on said rod below said sleeve for selectively limiting the movement of said sleeve with respect to said rod;

a collar selectively vertically mounted on said sleeve and having a bolt secured thereto which extends laterally therefrom whereby the upward adjustment of said securing means on said rod causes said bracket means to be moved into engagement with the flange on a side wall of the bed; and a substantially vertically disposed spare tire which is mounted on said bolt and supported upon said upper surface of said base portion.

2. The spare tire mount of claim 1 wherein said underside of said base portion includes slippage prevention means to prevent slippage with respect to said bed floor.

3. The spare tire mount of claim 2 wherein said floor has a series of parallel ribs defining grooves therebetween and wherein said slippage prevention means comprises at least two feet, each foot having a cylindrical shape with a lengthwise axis, said lengthwise axis being parallel to the ribs, said feet disposed distally on said underside of said base portion and adapted to be received into the grooves.

4. The spare tire mount of claim 2 wherein said slippage prevention means comprises deformable padding.

5. The spare tire mount of claim 2 wherein said rod is externally threaded and said securing means is internally threaded for reception thereon.

6. The spare tire mount of claim 5 wherein said securing means including two nuts threadably mounted on said rod positioned against each other.

7. The spare tire mount of claim 1 wherein each inwardly extending flange includes a lower surface and an inner edge, the inner edge having a downwardly extending lip extending therefrom and wherein said bracket means further comprises a first horizontal plate having a distal end connected to and extending orthogonally outward from said upper end of said sleeve; a vertical plate having an upper edge connected to and extending upwardly from said distal end of said first horizontal plate; and a second horizontal plate having an upper face connected to and extending outwardly from said upper edge of said vertical plate whereby said upper face of said second horizontal plate is adapted for engagement with the lower surface of the inwardly extending flange.

8. The spare tire mount of claim 1 wherein said collar includes positioning means; for securing said collar to a particular position on said sleeve, said bolt being threaded; said spare tire mount further comprising nut means threadably mounted on said bolt for securing said tire on said bolt.

9. The spare tire mount of claim 8 further comprising a retaining plate having an aperture adapted to receive said bolt, said retaining plate mounted on said bolt between said nut means and said collar.

10. The spare tire mount of claim 9 wherein said nut means is a locking lug nut.

11. The spare tire mount of claim 3 wherein said rod is externally threaded, said securing means including two nuts threadably mounted on said rod positioned against each other, said collar including positioning means for securing said collar to a particular position on said sleeve, said bolt being threaded; said spare tire mount further comprising nut means threadably mounted on said bolt for securing said tire on said bolt, and a retaining plate having an aperture adapted to receive said bolt, said retaining plate mounted on said bolt between said nut means and said collar.

12. A spare tire mount for a pickup truck including a bed having a floor and upstanding side walls which include upper ends, the upper ends having inwardly extending flanges connected thereto, and bed for lining said pickup truck bed liner means in said pickup truck bed, comprising:

a lower unit including a base portion having an underside configured for engagement with the bed liner means and a substantially planar upper surface and having a rod with an upper end secured thereto which extends upwardly therefrom;

an upper unit including a substantially vertically disposed, hollow sleeve having upper and lower ends, and a bracket means secured to said sleeve at the upper end thereof, said sleeve being adjustably mounted on said upper end of said rod;

securing means adjustably mounted on said rod below said sleeve for selectively limiting the movement of said sleeve with respect to said rod;

a collar selectively vertically mounted on said sleeve and having a bolt secured thereto which extends laterally therefrom whereby the upward adjustment of said securing means on said rod causes said bracket means to be moved into engagement with the flange on a side wall of the bed, and a substantially vertically disposed spare tire is mounted on said upper surface of said bolt and supported upon said base portion.

* * * * *